Patented Aug. 15, 1939

2,169,918

UNITED STATES PATENT OFFICE 2,169,918

LUBRICANT

Armin Joseph Kraus, Jersey City, N. J., assignor to The Richards Chemical Works, Incorporated, Jersey City, N. J., a corporation of New Jersey No Drawing. Application July 16, 1937,
Serial No. 154,013

2 Claims. (Cl. 87—9)

My invention relates to new types of lubricants and the process of producing the same.

It is well known that certain higher molecular weight hydrocarbons in a lubricant sooner or later decompose. In use, when the lubricant is subjected to high pressure, heat and friction simultaneously, it inevitably loses a high percentage of its inherent film strength.

This film strength results from the chemical power expressed in the inter-molecular bond plus the physical power manifested in the cohesiveness of the layers of film inter se and in the adhesiveness of the film to a metallic surface. The chemical power determines the oiliness or lubricity and the physical powers determine the adhesive quality of a lubricant. According to the nature of the work for which the lubricant is used, at times lubricity is of the utmost importance and at other times adhesion must be predominant.

To increase the adhesive power of lubricants, raw materials possessing an inherent high degree of adhesiveness are at present used either in the form of a solution or added directly in dissolved form or combined in a saponified state. In all instances this extraneously increased adhesiveness in a lubricant becomes subject to an accelerated deterioration in proportion to the severity of the extreme pressure conditions put upon it. To mention but two of these subversive factors: The presence of heat and air brings about a steady oxidation. In the degree to which oxidation progresses, the physical character of the lubricant undergoes a complete internal change, resulting finally in the transformation of an originally fluid or semi-fluid lubricant into solid matter, from which all adhesiveness is absent. Continued subjection of this lubricant to the conditions which promote deterioration, will cause further oxidation until the lubricant has been gradually but finally converted into a brittle, often even pulverized, substance.

With the foregoing in mind, the object of my invention is to provide new types of lubricants which are wholly and finally stable as to composition, with the consequence that such lubricants whether of solid, fluid or semi-fluid consistency undergo no physical or chemical change in use and their natural adhesiveness is not only retained but is actually increased.

In the preparation of the lubricants of my invention I carry out a process of polymerization in a manner to produce lubricants with a finally stabilized solid, fluid or semi-fluid consistency, dependent on the materials used and the procedure followed.

As starting materials I employ those hydrocarbons which, regardless of their original consistency, are of such molecular structure that the hydrocarbons are capable of combining with sulphur. Examples of such starting materials are the unsaturated as well as the saturated hydrocarbons present in asphalt base crudes, known as naphthenic acids; mineral waxes, as for example ozocerite derived from certain Galician and Roumanian crudes and certain greases and fats of vegetable or animal origin, all capable of conversion, as the first step in this polymerization, either partially or completely into a sulphurized product. If sulphurization is effected in a manner to obtain incompletely sulphurized products of an unsaturated molecular structure, these intermediates are in a high degree subject to polymerization.

The hydrocarbons above referred to are polymerized in the presence of other hydrocarbons which are themselves capable of polymerization without previous sulphuration, and the polymerization procedure is effected with the use of an organic reagent which acts as a catalyst. As far as I am aware, the catalyst I employ is entirely new and consists of a solution of raw caoutchouc in hepta and octa naphthenic acids.

Only an exceedingly small amount of this organic substance is required to accomplish perfect polymerization. Due to the fact that this negligibly small amount is absolutely necessary to convert all the intermediates into polymerized products having the above mentioned desired final characteristics, their chemical action may be assumed to be catalytic although at the end of the reaction they have completely disappeared being merged into the polymerization process.

The primary source of crude ozocerite is the salt clay layer of marine settlements in Neogen earth formations. Ozocerite, or earth wax, is therefore in genetic relationship with mineral oil, the origin of both being animal fatty acids. Its main constituents are amorphous and isoparaffin hydrocarbons of a branched chain molecular structure.

By heating ozocerite at a temperature of 150° C., at atmospheric pressure in the presence of sulphur for 12 hours products are obtained which are partly simply sulphurized and partly oxidized and sulphurized. These substances are of a liquid, semi-liquid and solid consistency. The smaller part of the same are saponifiable, the larger part unsaponifiable. The latter substance is a mixture of saturated and unsaturated hydrocarbons representing groups of naphthenes and naphthenic acids.

By adding to this sulphur treated earth wax as little as one tenth of one per cent of the above mentioned catalyst and heating the batch to different predetermined temperatures complete polymerization can be achieved. The following examples will serve to illustrate, without intending to limit, the present invention.

*Example 1*

In a direct fire heated iron kettle 110 pounds ozocerite are dissolved in 400 pounds asphalt base mineral oil, then heated to 125° C. 15 pounds precipitated sulphur are now mixed in and the temperature is slowly increased to 200° C., the mixture being constantly agitated. This temperature is maintained for about 2 hours, then slowly brought down to 60 to 70° C. The contents of the kettle are now released through a fine screen into a superheated steam jacketed kettle. The yield of this sulphurized material is about 515 pounds and now 250 grams of the catalyst are worked into the batch. Steam is turned on and the heat so regulated that in about 3 hours a temperature of 130° C. is reached. This heat is maintained for 1½ to 2 hours then the kettle content is cooled down to air temperature, agitation being effected. The resulting product is a semi-liquid, highly viscose lubricant possessing all the physical and chemical characteristics referred to.

Through the selection of different viscosity mineral oils, combined with varying amounts of wax and sulphur, lubricants of all desired viscosity grades can be obtained.

*Example 2*

The direct fire kettle is charged with 30 pounds montan wax, 30 pounds ozocerite, 25 pounds naphthenic sludge, 15 pounds ricinoleic acid and 20 pounds extra heavy asphalt base mineral oil. Kettle content is now heated up to 135° C., and 18 pounds of sulphur mixed in. Heat is then slowly increased up to 240° C., with a steady agitation. After sulphuration is completed at this temperature the kettle content is slowly brought down to 100° C., the material screened and run into the steam jacketed kettle, where it is thoroughly mixed with 200 grams of catalyst. Heat is then turned on and the temperature during the next 6 hours increased to 150° C., and for 1 hour kept at this temperature after which the heat is turned off and the kettle cooled down to air temperature. In this way a consistent, extremely adhesive lubricant is obtained which finds useful application in, for example, the lubrication of various types of gears.

*Example 3*

55 pounds naphthenic sludge, 25 pounds beeswax, 20 pounds wool grease and 25 pounds of tallow fatty acids are sulphurized with 22 pounds sulphur in the presence of 350 pounds lignite tar at 200° C., sulphuration time 7 hours. Afterwards polymerization is carried out with 1 pound of catalyst at 240° C. for 7 to 8 hours. The resulting product is a solid lubricant which may be used, in molten condition, for the lubrication of wire ropes and horizontal gears.

By the polymerization process of my invention lubricants are developed which are no longer subject to deterioration, showing the typical nature of colloids. Their outstanding characteristics are:

1. Chemical and physical homogeneousness.
2. Resistance and stability against spontaneous physical external forces such as pressure, heat or friction, individually or collectively.
3. Resistance to water, steam, hot air, acids or alkaline gases.
4. Unchanged viscosity and adhesiveness under the most severe operating conditions.
5. Complete reversibility into the original state of consistency, retaining here again the original grade of viscosity if an oil, and melting point if a grease.

The practical advantages resulting from the use of this class of new colloidal lubricants may be summarized as follows:

a. Substantially perfect lubrication.
b. Substantially perfect cooling.
c. Substantially perfect protection against grinding, wear and tear of the moving, rotary or sliding machine parts.
d. Highest economy in repair as well as lubrication.
e. Increased production by the installation or plant where the lubricant is used.

It will be apparent to those skilled in the art that the invention is susceptible of modification in respect to the specific substances, temperatures and pressures used and that all such modifications are deemed to be included within the scope of the invention as defined by the appended claims.

I claim:

1. A highly viscous and stable lubricant comprising the product of polymerizing by means of a catalyst consisting of a solution of raw caoutchouc in hepta and octa naphthenic acids, a readily sulphurizable material selected from the class consisting of mineral waxes present in asphalt base crudes and oils and fats of vegetable and animal origin, in the presence of a hydrocarbon containing naphthenic acids and capable of being polymerized without previous sulphurization.

2. The herein described process of producing a highly viscous and stable lubricant, which process comprises heating in the presence of sulphur, a readily sulphurizable material selected from the class consisting of mineral waxes present in asphalt base crudes and oils and fats of vegetable and animal origin, and a hydrocarbon containing naphthenic acids and capable of being polymerized without previous sulphurization, and treating the resulting product with a catalyst consisting of a solution of raw caoutchouc in hepta and octa naphthenic acids under such conditions as to effect polymerization and form a viscous stable composition.

ARMIN JOSEPH KRAUS.